United States Patent
Ayyadevara et al.

(10) Patent No.: US 11,546,444 B2
(45) Date of Patent: Jan. 3, 2023

(54) TRAFFIC FORWARDING AND DISAMBIGUATION BY USING LOCAL PROXIES AND ADDRESSES

(71) Applicant: Akamai Technologies, Inc., Cambridge, MA (US)

(72) Inventors: Seetharama Sarma Ayyadevara, San Jose, CA (US); Charles E. Gero, Quincy, MA (US); Stephan Benny, Pleasanton, CA (US); Pravin Tatti, Bengalore (IN); Manoj Kumar, Los Gatos, CA (US); Seemant Choudhary, Fremont, CA (US); Robert Lauro Quiros, Menlo Park, CA (US); Priyatham Phani Srinath Adigopula, Bangalore (IN); Poornima Venkatesha, Sr., Milpitas, CA (US); Sumeet Gupta, Bangalore (IN)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/361,364

(22) Filed: Mar. 22, 2019

(65) Prior Publication Data
US 2019/0297161 A1    Sep. 26, 2019

Related U.S. Application Data

(60) Provisional application No. 62/646,401, filed on Mar. 22, 2018.

(51) Int. Cl.
G06F 15/173    (2006.01)
H04L 67/56    (2022.01)
(Continued)

(52) U.S. Cl.
CPC .......... *H04L 67/56* (2022.05); *H04L 61/4511* (2022.05); *H04L 61/59* (2022.05)

(58) Field of Classification Search
CPC ..... H04L 45/64; H04L 63/0428; H04L 67/12; H04L 12/4633; H04L 41/0853;
(Continued)

(56) References Cited

U.S. PATENT DOCUMENTS 6,253,326 B1 *   6/2001   Lincke ................ G06F 16/9577
                                                 713/168
6,349,336 B1 *   2/2002   Sit .......................... G06F 21/305
                                                 709/227
(Continued)

FOREIGN PATENT DOCUMENTS

WO    2016160672 A1    10/2016

OTHER PUBLICATIONS

PCT/US2019023655 International Search Report and Written Opinion dated Jun. 27, 2019, 8 pages.
(Continued)

*Primary Examiner* — Dustin Nguyen
(74) *Attorney, Agent, or Firm* — David H. Judson

(57) ABSTRACT

A method of traffic forwarding and disambiguation through the use of local proxies and addresses. The technique leverages DNS to on-ramp traffic to a local proxy. The local proxy runs on the end user's device. According to a first embodiment, DNS is used to remap what would normally be a wide range of IP addresses to localhost based on 127.0.0.0/8 listening sockets, where the system can then listen for connections and data. In a second embodiment, a localhost proxy based on a TUN/TAP interface (or other packet interception method) with a user-defined CIDR range
(Continued)

to which the local DNS server drives traffic is used. Requests on that local proxy are annotated (by adding data to the upstream connection).

19 Claims, 3 Drawing Sheets

(51) Int. Cl.
*H04L 61/4511* (2022.01)
*H04L 61/59* (2022.01)

(58) Field of Classification Search
CPC .............. H04L 61/2076; H04L 65/105; H04L 67/2814; H04L 67/2833; H04L 9/085; H04L 41/044; H04L 67/28; H04L 47/828; H04W 76/10; H04W 12/0013; H04W 4/029; G06F 9/5072; G06F 21/305; G06F 8/31; G06F 9/54; G06F 16/9577
See application file for complete search history.

(56) References Cited

U.S. PATENT DOCUMENTS

| | | | |
|---|---|---|---|
| 7,013,338 B1* | 3/2006 | Nag | H04L 47/828 709/227 |
| 7,346,649 B1 | 3/2008 | Wong | |
| 8,024,450 B1* | 9/2011 | Shiyafetdinov | H04L 41/044 709/223 |
| 8,910,273 B1* | 12/2014 | Fausak | H04L 67/2823 726/15 |
| 9,609,077 B1* | 3/2017 | Olsen | H04L 67/2814 |
| 9,749,293 B2* | 8/2017 | Le | H04W 12/0013 |
| 2002/0071567 A1* | 6/2002 | Kurn | H04L 9/085 380/286 |
| 2002/0161904 A1* | 10/2002 | Tredoux | H04L 67/2814 709/229 |
| 2003/0187983 A1* | 10/2003 | Rajic | G06F 9/54 709/225 |
| 2005/0021689 A1* | 1/2005 | Marvin | G06F 8/31 709/220 |
| 2007/0160200 A1* | 7/2007 | Ishikawa | H04L 63/0428 380/30 |
| 2008/0301312 A1 | 12/2008 | Fernandes et al. | |
| 2009/0260074 A1* | 10/2009 | De Spiegeleer | H04L 67/28 726/15 |
| 2012/0036233 A1* | 2/2012 | Scahill | H04L 61/2076 709/220 |
| 2013/0204988 A1* | 8/2013 | Grewal | H04L 65/105 709/221 |
| 2013/0246606 A1* | 9/2013 | Branch | H04L 41/0853 709/224 |
| 2014/0006347 A1* | 1/2014 | Qureshi | H04W 4/029 707/621 |
| 2014/0122727 A1* | 5/2014 | Miner | H04L 67/12 709/227 |
| 2015/0016261 A1* | 1/2015 | Backholm | H04W 28/0289 370/235 |
| 2015/0341445 A1* | 11/2015 | Nikolov | G06F 9/5072 709/203 |
| 2016/0164825 A1 | 6/2016 | Riedel et al. | |
| 2016/0337104 A1* | 11/2016 | Kalligudd | H04W 76/10 |
| 2017/0195161 A1 | 7/2017 | Ruel et al. | |
| 2017/0223063 A1* | 8/2017 | Herrero | H04L 12/4633 |
| 2018/0091417 A1* | 3/2018 | Ore | H04L 45/64 |

OTHER PUBLICATIONS

European Patent Application 19771685.5, extended European search report, dated Nov. 12, 2021, 11 pages.

\* cited by examiner

| Domain Name | Localhost Address |
|---|---|
| portal.example.com | 127.250.250.250 |
| sap.example.com | 127.250.250.249 |
| ⋮ | ⋮ |
| git.example.com | 127.119.43.2 |

| Real IP | Localhost Address |
|---|---|
| 192.168.100.12 | 127.214.36.71 |

| Domain Name | Localhost Address | External Proxy IP/Hostname |
|---|---|---|
| portal.example.com | 127.250.250.250 | 173.222.251.78 |
| sap.example.com | 127.250.250.249 | sap-example-com.external-proxy.net |
| git.example.com | 127.119.43.2 | m1.external-proxy.net |
| ⋮ | ⋮ | ⋮ |
| rdp.example.com | 127.119.43.250 | m1.external-proxy.net |

TRAFFIC FORWARDING AND DISAMBIGUATION BY USING LOCAL PROXIES AND ADDRESSES

BACKGROUND

Technical Field

This application relates generally to techniques for managing traffic on a network.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

There exist use cases in security, performance, access, and beyond where it is beneficial to redirect traffic originating on an endpoint that is in-route to a destination to instead egress through an interim proxy. Among other things, the interim proxy can be used for security services, performance upgrades, visibility and logging, acceptable use policies, data treatments, encapsulation, delivery to other proxies, and more. When traffic arrives on such a proxy, and after any necessary treatments are performed, the proxy must be able to determine the next hop or destination to which to forward the traffic. There are two general broad categories for how this can be achieved, and their applicability is determined by whether the traffic in question is proxy-friendly. As used herein, the notion of being proxy friendly is defined as the ability to determine where the traffic is originally destined at Open System Interconnection (OSI) Layers 5 through 7 in the data flow, without any external annotation. An example of this is the HOST header in HTTP (HyperText Transfer Protocol) or the SNI extension in TLS (Transport Layer Security Protocol). Both allow a proxy that has been arbitrarily inserted into a data flow and without access to the original destination address to discover the intended final destination.

Traffic that is not proxy-friendly needs some other way to disambiguate or discover the final destination. One method that is well known in the art is the use of virtual Internet Protocol addresses (IPs), or so-called VIPs. In particular, if there are a finite number of possible end locations, and the cardinality of that set is known ahead of time, a proxy can be provisioned with one or more IP addresses per end location. Then, and without modification of the data in Layers 5 through 7, an endpoint can direct traffic to a specific IP or set of IPs, and the proxy can disambiguate the final destination based upon which IP address traffic arrived on. While this method works well when the cardinality of the set is of limited size, it quickly becomes impractical as the number of possible locations increases beyond the set of allocate-able Internet Protocol (IP) addresses on the proxy.

The problem is particularly intractable if the proxy VIPs must be reachable on the Internet, and the proxy itself must be able to service the full range of Internet sites. In that case, a single proxy would need to be able to own one half of the allocate-able IP addresses on the Internet just to disambiguate uniquely. Moreover, as new proxies are introduced, the portion of IP addresses on the Internet available to non-proxies would need to shrink to 1/n+1 of the total set, where n is the total number of proxies. This does not work at scale.

In these cases, the general method of protocol annotation comes into play. Protocol annotation is the act of modifying the stream of original data to include the destination in OSI Layers 5 through 7. A very common method employed in these use cases is that of the tunnel. When an application tunnels traffic to a proxy, it takes the original traffic, including enough information from Layers 2 through 4, to give the destination address (as well as additional details) accurately, and the proxy embeds that data into OSI Layers 5, 6, 7 (or some combination thereof) of a separate connection maintained with the proxy. The proxy is then able to read the destination information within the tunnel to determine final locations.

While the above-identified approaches provide some advantage, there remains a need to provide enhanced techniques.

BRIEF SUMMARY

This disclosure describes a method of traffic forwarding and disambiguation through the use of local proxies and addresses. The technique leverages a Domain Name Service (DNS) to on-ramp traffic to a local proxy. To this end, preferably a local proxy runs on an end user's device. According to a first embodiment, DNS is used to remap what would normally be a wide range of IP addresses to a localhost (i.e., a hostname for the local device itself) based on 127.0.0.0/8 (CIDR) listening sockets, where the system can then listen for connections and data. In a second embodiment, a localhost proxy based on a virtual network kernel (e.g., TUN/TAP) interface (or other packet interception method) with a Classless Inter-Domain Routing (CIDR) range to which the local DNS server drives traffic is used. Requests on that local proxy preferably are annotated (by adding data to the upstream connection).

Thus, for example, in the first embodiment an enterprise user (a service customer) pre-configures a hosted enterprise application by providing a domain name (or "hostname") the application runs on, and on what port it listens. That configuration is then delivered to a thin client (executing on an end user machine or other endpoint), which then picks a unique localhost address, assigns it to the domain name, and begins listening on the designated localhost/port pair. When the local application on the end user machine does a DNS lookup, the thin client intercepts the DNS query and returns the designated localhost address. When the local application on the end user machine connects to the returned localhost address on the configured port, it reaches a local proxy, which preferably then establishes a connection to an edge server (in an overlay network embodiment) and sends the data through the overlay to a connector and then to the enterprise-hosted application.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
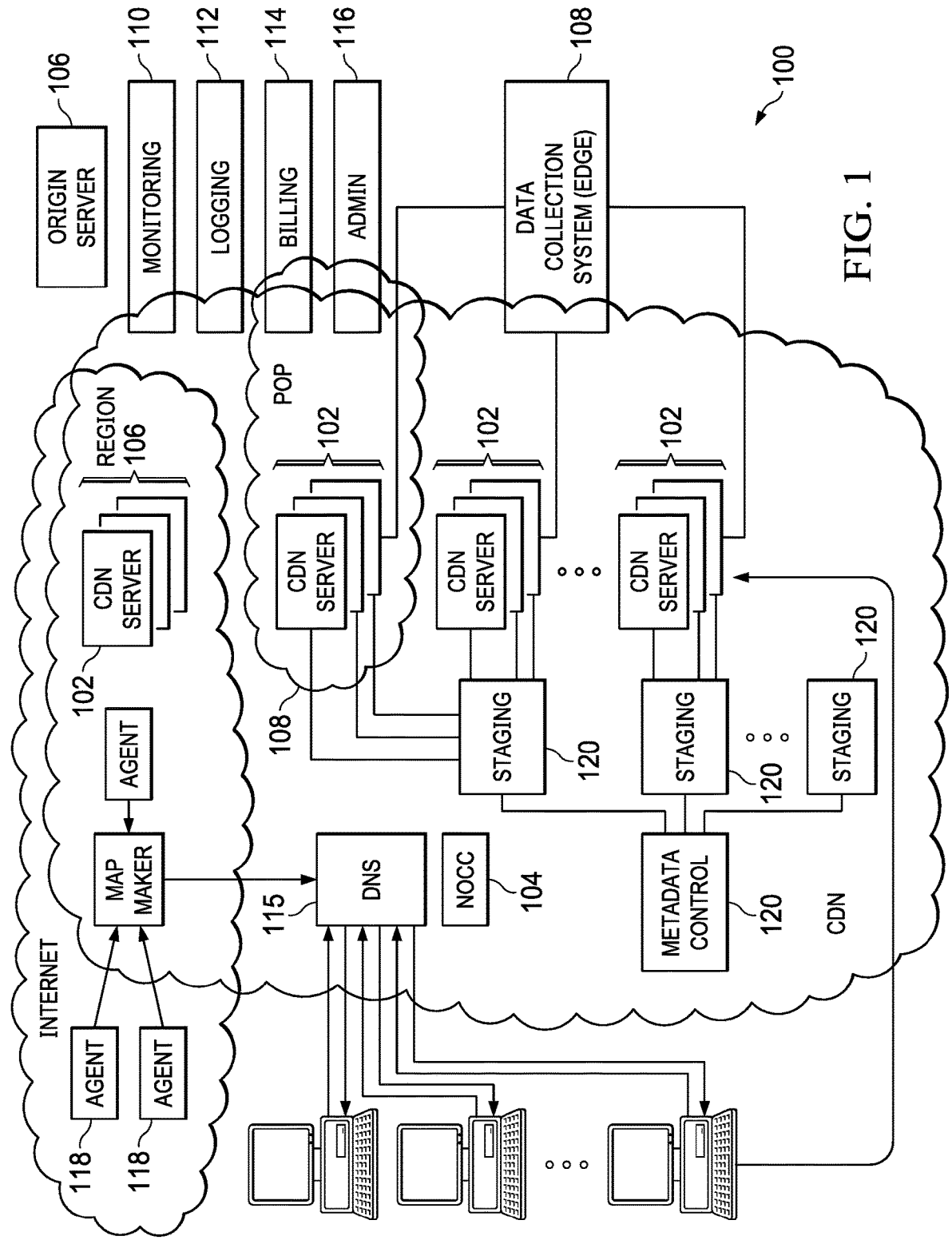
FIG. 1 is a block diagram illustrating a known distributed computer system configured as a content delivery network (CDN)

The techniques of this disclosure may be implemented within the context of an overlay network, such as a content delivery network (CDN), although this is not a limitation. In a known system of this type, such as shown in FIG. 1, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figures 2, 3, 4:
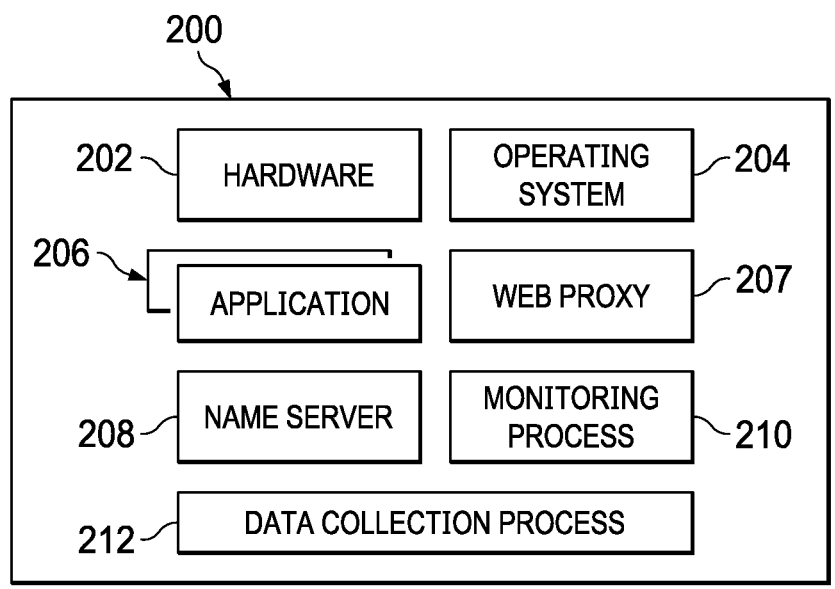
FIG. 2 is a representative CDN edge machine configuration.
FIG. 3 depicts a representative domain name to localhost address mapping table in according to one embodiment of the technique of this disclosure.
FIG. 4 depicts a variant approach wherein the mapping table includes a mapping that associates a real IP address with a localhost addresses.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like. For streaming media, the machine typically includes one or more media servers as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Traffic Forwarding and Disambiguation Through the Use of Local Proxies and Addresses With the above as background, the techniques of this disclosure are now described.

As will be described, the approach herein provides a method for capturing and annotating traffic such that it can be disambiguated at interim proxies. The techniques may be implemented in association with an overlay network generally (such as a CDN) as depicted in FIG. 1, in association with a cloud service, or in association with any network-accessible access control system.

Preferably, and in accordance with this disclosure, there are variety of methods that can be used on an endpoint to capture traffic and annotate it. To this end, the subject matter of this disclosure in now described.

In one embodiment, a Domain Name Service (DNS) server runs on an endpoint, namely, an end user client machine such as a mobile device, a laptop, a desktop, or the like. The machine also preferably runs a local proxy (a process or program executing in the local environment). When a user or process attempts to access a destination (e.g., an enterprise application hosted behind a firewall) on a network through its hostname, the DNS server sees the requested query. If the query matches a hostname for a site whose traffic should be on-ramped through the proxy, the DNS server returns a customized address in a manner that is now described.

In particular, the DNS server picks some address in the CIDR block 127.0.0.0/8. These are known as localhost addresses and the entire set of 16.7 million of them map to the endpoint's own machine. The address the DNS server picks should not currently be in use for other traffic. Additionally, the DNS server preferably creates a map, or dictionary, on the endpoint that maps the given domain name to the localhost address that has been chosen and vice versa. FIG. 3 depicts a representative mapping.

As soon as the address and the domain name have been added to the map, the DNS server returns the address back to the requesting process. When the process that made the DNS request receives the IP address back, it attempts to connect or send packets to the given location. Listening on all ports on all localhost addresses is a local proxy server. This local proxy server shares the map above with the DNS server, and upon a connection or packets being sent to a specific localhost address, it knows from the map the domain name for which it is intended. The local proxy server then takes the data being sent to it, optionally including packet framing and additional details, and tunnels it to a configured external proxy server. Included in the tunnel preferably is the application data, information about the original domain name that was looked up, optional packet framing and additional information, and encoding into whatever wire format the external proxy expects. When the external proxy server receives the packets or connection, it examines the embedded annotated information to learn what the final destination is. Optionally, the external proxy passes the flow with annotation on to other external proxies as well as performing any modifications or policy actions noted earlier on the flow. When the final proxy in the chain is ready to send the data to the original destination, preferably it removes all of the annotations and framing, performs a DNS lookup on the given annotated domain name, and then sends packets and connections towards the returned IP.

Thus, according to the technique of this disclosure, an enterprise user (the service customer) pre-configures a hosted enterprise application by providing the domain name the application runs on, and what port it listens on. That configuration is then delivered to a thin client, which then picks a unique localhost address, assigns it to the domain name, and begins listening on the designated localhost/port pair. When the local application on the end user machine does a DNS lookup, the thin client intercepts the DNS query and returns the designated localhost address. When the local application on the end user machine connects to the returned localhost address on the configured port, it reaches a local proxy, which preferably then establishes a connection to an edge server (in an overlay network embodiment) and sends the data through the overlay to a connector (as described, for example, in the above-identified patents) and then to the enterprise-hosted application.

The thin client approach thus uses DNS to remap what would normally be a wide range of IP addresses to localhost, where the system can then listen for connections and data (e.g., intended for the enterprise-hosted application).

To determine the destination, the technique establishes a one-to-one map with the specific localhost address being requested and then gets the port from the packet.

Variants

IP Keys

In one variation of the above-described technique, domain names are not stored in the map or dictionary on the endpoint, but rather the resolved IP addresses are stored instead. For example, imagine the user or process attempts to lookup hr.example.com so that it can make a connection to it. The DNS server would see this request, and in this variation, the DNS server would perform the lookup for hr.example.com itself. Assume that the IP address 192.168.100.12 is returned and that the DNS server has chosen localhost address 127.214.36.71 for this location. The DNS server would load the record for this connection in the map as shown in FIG. 4. In this IP keys variation, the final proxy would not need to perform a new DNS lookup but instead could rely on the endpoint's resolution.

Central DNS

Another variation is the omission of the local DNS server that runs on the endpoint. If a given company, enterprise, or administrative domain has a static number of applications they are onboarding to an external proxy, they could point all of their endpoints to a central DNS server that maintains the static mapping. In this case, the static mapping, which looks identical to those shown earlier, would be distributed to endpoints and only the localhost proxy would run. When a user performed a DNS lookup for an application such as portal.example.com from earlier, that lookup is sent to a centralized DNS server that is off of the endpoint.

In this embodiment, the centralized DNS server also has the static map and returns the associated IP (127.250.250.250 in the earlier example). The endpoint receives this IP address and establishes a connection or send packets to it as noted earlier. The localhost proxy receives the connection attempt or packets on that destination address, and in combination with the static map, is able to annotate the packets or connection before sending them to the external proxy as before. The benefits of this central DNS variant is less complexity on the endpoint along with the ability to deny access to users not using the endpoint software stack.

Other Variants/Use Cases

The local proxy may be used to provide other services, such as to apply Quality of Service (QoS), to stop or otherwise limit traffic if it exceeds mobile quotas, connection termination (the ability to terminate all active connections upon a security risk having been detected), step-up authentication (the ability to "pause live connections" and challenge for a new authenticator if suspicious activity is detected), applying other security policy (e.g. policy to limit app access by time of day or any other discoverable detail from the set of information gatherable during an application access), and so forth.

Additional Data and Attribution

Additional information can be embedded into the annotated connection details. This information includes, for example, the identity of the user making the connection or sending packets, their local IP address, their MAC address, posture of the end device, arbitrary data tags or labels, the process or application making the request, and much more. The annotated tunnel should be treated not only as a method to determine final destination, but a general purpose information channel that can carry additional attributes that a proxy might find interesting.

Identity and Access Policy

While the localhost proxy enables transport of both proxy friendly and proxy-unfriendly traffic, it also allows for mechanisms to establish user identity at the intermediate proxy. The localhost proxy can have an embedded authentication agent which establishes identity using authentication protocols such as client certificates, Kerberos, OAuth, OpenID, or SAML and 2FA. This use of the localhost proxy allows for the ability to overlay stronger authentication schemes for the on boarded traffic, suitable for access over the WAN.

An access policy specifies application traffic streams acceptable via the localhost proxy and also establishes the traffic path via the intermediate proxies to its final destination. System administrators can define and bind access policies to the system users. The policies can be delivered to the localhost proxy and intermediate proxies as one of the attributes of the authentication exchange. Thus, the use of a localhost proxy allows transparent overlaying of fine-grained identity based access policies with respect to application traffic.

Concurrent Access to Overlapping Networks

Virtual private network based access solutions extend the enterprise networks to the user's device and in the process, alter the network configuration of the device to route the enterprise network bound traffic over a VPN tunnel. Because most enterprise networks operate in IETF RFC 1918 private IP address space, establishing VPN tunnels concurrently to two different but overlapping networks is very difficult due to the risk of collision of IP addresses.

The localhost proxy based approach of this disclosure does not have such limitations. By allowing policy on the localhost proxy to determine which external proxy to steer traffic to (based on domain name), combined with each proxy having a globally unique IP address, context-aware routing based on hostnames can be performed, even when the underlying IP addresses would have made routing ambiguous at the network layer. For example, in a scenario commonly found in a cloud based service environment, where many disjoint networks or POPs may need to be managed, the ability to gain concurrent access to individual machines within all the POPs can significantly reduce operational complexity.

Methods to Select External Proxy

Figures 5, 6:
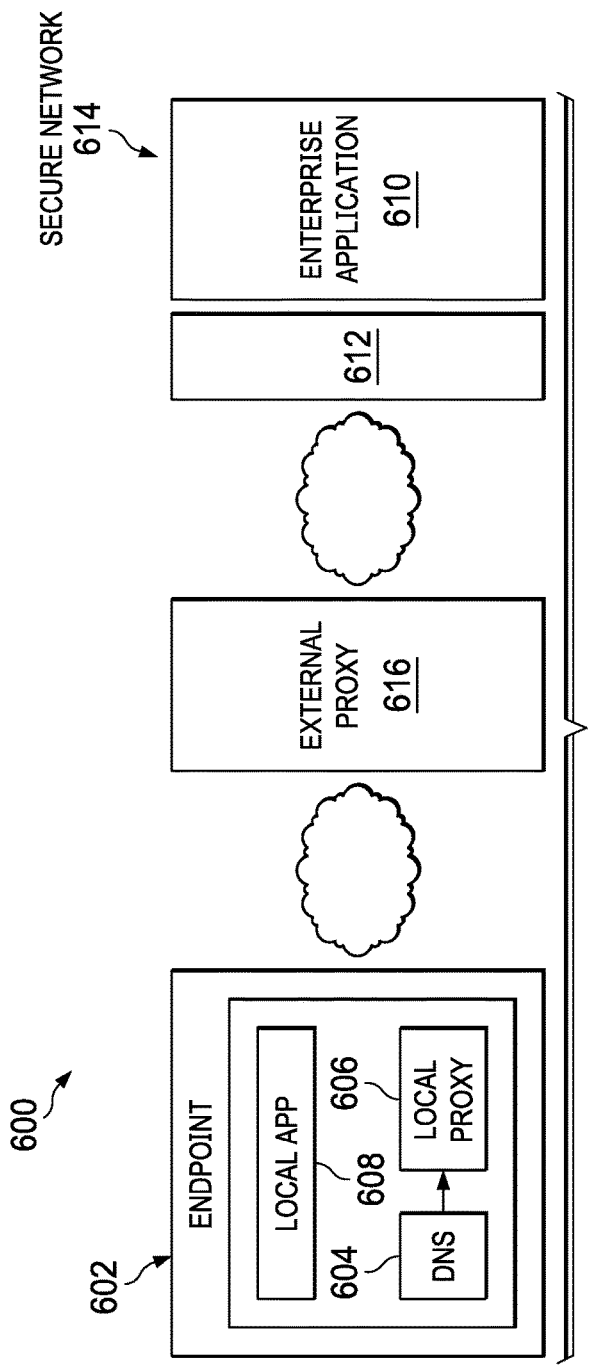
FIG. 5 depicts another variant approach wherein the mapping table may be used to multiplex more than one application hostname connection and/or packets in one or more external proxy connections or tunnels.
FIG. 6 depicts a representative implementation of the technique of this disclosure wherein an endpoint running a DNS server and a local proxy is coupled to a secure network via an external proxy.

The following describes representative methods to select the external proxy. Upon receiving the connections or packets from the user or process, the localhost proxy selects the external proxy to establish a connection or tunnel to for transmission of said connections and packets. In some cases, the external proxy is configured to be an IP address made available to the local proxy from a volatile or non-volatile configuration database. In some cases, the external proxy is configured to be a hostname. The localhost proxy, upon reading the external proxy hostname from a configuration database or store, performs a DNS query to obtain the IP address and subsequently establish connections to the external proxy. In this variation, the localhost proxy may multiplex more than one application hostname connection and/or packets in one or more external proxy connections or tunnels. The localhost proxy represents the individual application hostname connections or packets as unique streams among the totality of external proxy connections. As mentioned above, the localhost proxy annotates the individual streams with attributes to disambiguate the endpoint application traffic. The table shown in FIG. 5 illustrates these variations.

Selectively On-Ramp Connections/packets On a Hostname Basis

Virtual Private Networks, or VPNs, preserve the confidentiality and integrity of endpoint application connections and packets. VPNs provide this functionality by transferring the data/packets via encrypted tunnels even when the underlying network is public and untrusted. As an example, some VPNs create a virtual network interface on the end-user device and establish it as a direct extension of the corporate network through route table modifications and encryption. VPNs can also selectively route traffic to certain IP addresses or networks via this virtual network interface. Most VPNs operate at the IP layer (OSI Layer 3) and typically wrap the packets into the encrypted network tunnel without the need to modify or inspect the packets.

Selectively preserving the confidentiality and integrity of the application connections and packets at the granularity of a hostname while not making any modifications to the application, such as a web browser, however, is new. As described in the above sections, the localhost proxy encapsulates the application hostname connections and packets into the external proxy connections without modifying or inspecting the data and packets.

Advantages

The technique of this disclosure, whereby DNS is used to selectively on-board applications/hostnames onto local address space (e.g., without limitation, 127.0.0.0/8) and then transparently adding authentication on top of this connection in the context of an access solution, provides significant advantages.

Among the advantages to the above methods are the requirement of only a single IP address for the external proxy as opposed to requiring multiple or worse, some integral multiplier against the number of destinations to be supported. The approach leverages DNS, a common networking substrate, to provide on-ramping. There is no requirement for integrating with VPN hooks on an end user system, thus enabling the method to coexist with VPNs that are already installed. Implementing the approach (e.g., using user space software) ensures that there is no danger to a system at the kernel level. The technique facilitates overlay of stronger authentication schemes for the on-boarded application traffic, as well as the ability to overlay fine-grained identity-based access policy for the on-boarded application. The technique also allows concurrent access to services in disjoint networks.

Without intending to be limited, the approach herein can be applied to hosts on a private network, as well as those on the Internet, regardless of where an endpoint or use is located. Particular applicability of the approach herein includes the following use cases: access to internal enterprise assets (e.g., as a VPN replacement or supplement), secure web gateway for arbitrary Internet sites, CASB functionality for sanctioned Internet SaaS, any service requiring Identity (AUP, access policy, authorization), zero trust environments (software-define perimeter or otherwise beyond corporate/on-ramping, and generalized caching, CDN, or other performance optimization scenarios, Data Loss Prevention (DLP) environments, and so forth.

TUN/TAP

As noted above, a significant advantage provided by the thin client approach is that it uses DNS to remap what would normally be a wide range of IP addresses to localhost, where the system can then listen for connections and data. This notion, however, need not be limited to localhost based on 127.0.0.0/8 listening sockets (to which the local DNS server drives traffic); an alternative, which is now described, is to utilize a localhost proxy based on a TUN/TAP (or other packet interception method) with a user defined CIDR range to which the local DNS server drives traffic. TUN/TAP interfaces are a feature offered by Linux (or other UNIX-based operating systems) that support user space networking, i.e., that allow user space programs to see raw network traffic (at the Ethernet or IP level) and to process that traffic. TUN/TAP interfaces are virtual network kernel devices. A VPN usually sets up a TUN/TAP interface and then sets routes for the traffic it wants to capture. In most cases, this is 0.0.0.0/0 (default route), but in split tunnels, it can be individual and more specific routes. When the technique of this disclosure is implemented, it is desired to capture traffic without interfering with those routes. By implementing this alternative approach, co-existence with VPNs is enabled.

In this approach, a service customer (namely, the enterprise hosting the enterprise application) picks some subnet that is not currently in use. For example, assume the enterprise is on the 172.16.0.0/16 subnet, but that they do not use 10.0.0.0/8. The latter range (10.0.0.0/8) is then configured as a "capture" range. This is a range that their VPNs currently do not service; in a further alternative, this range is auto-discovered. Once this configuration is known, DNS is still used to remap any application hostname IP into a "protected" range. But, instead of using listening sockets on the local machine, a TUN/TAP interface is created and used to bind the proxy. A representative data flow (using thick SSH by way of example only) would then be as follows. In particular, at step (1) an end user machine SSH client looks up an application hostname, e.g., ssh.provider.com. At step (2), a DNS interceptor returns 10.99.42.31 and creates a map in memory that associates that IP address with the hostname (an entry 10.99.42.31→ssh.provider.com). At step (3), a thick SSH client connects to 10.99.42.31 (i.e., generates a SYN packet and sends it). At step (4), a routing table routes it to the TUN/TAP interface (of this variant), where the local proxy sees the "packet." At step (5), the packet is wrapped with an annotation that identifies its "real" destination ("ssh.provider.com") and one or more authentication headers, and then sends out the result, e.g., the provider's edge network. At step (6), the provider's edge server (or some other proxy) receives the packets, looks at the domain name, and forwards the packet to the appropriate connector, which in turn performs Network Address Translation (NAT) and delivers the packet. In this manner, the TUN/TAP interface does not suffer from any potential port collisions (because it sees packets instead of listening for connections and binding to local ports). The approach installs a route that does not collide (irrespective of what the customer configures), with the result being that DNS is used to squeeze all returned IPs into a collision-free routing space.

This alternative approach to traffic forwarding has significant advantages. No ports are being listened on, and therefore there are no port collisions. DNS is used to remap a hostname away from its true IP address (which might otherwise be delivered on a VPN route) and instead onto an IP address that is delivered on a secure and specific (sometimes referred to herein as a "sacred") route. With this approach, there is no need to preconfigure what ports an application listens; preferably, only a hostname needs to be configured.

To further this approach, it may be desirable to intercept DNS SRV requests (e.g., associated with Windows Domain Joins) and combining them with the above-identified method. This enables tunneling of LANMAN/NTLM Domain Join protocol(s) to enable normal Windows Login to work transparently.

FIG. 6 depicts a representative implementation, namely, an endpoint computing machine 600 (e.g., a mobile device, a laptop, a desktop, a network-attached appliance or device, or the like) that includes computer memory/storage 602 that hosts the Domain Name Service (DNS) server 604, and the local proxy 606. As described, when a user or process (e.g., local application 608 attempts to access a destination (e.g., an enterprise application 610 hosted behind a firewall 612) on a network 614 through its hostname, the DNS server 604 sees the requested query. The enterprise application 610 thus executes in a secure computing environment. As has been described, and in response to receipt of the hostname from a local application or process 608, the DNS server 604 associates the hostname with a unique localhost address, listens on a designated localhost/port pair, and returns to the local application or process the unique localhost address. Typically, the unique localhost address is an unused address in CIDR block 127.0.0.0/8. In response to connection of the local application or process to the unique localhost address on a configured port, the local application or process connects to the local proxy 606. The local proxy is configured to establish a connection to an external proxy 616 (e.g., a CDN edge server) located between the endpoint and the computing machine on which the enterprise application 610 executes. The local proxy 606 is configured to annotate traffic prior to tunneling the annotated traffic to the external proxy. As also described, the local proxy 606 may provide an additional service, such as applying a Quality of Service (QoS), restricting traffic that is determined to exceed a quota, enabling a connection termination, enabling a step-up authentication, and applying a security policy.

Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

There is no limitation on the type of machine or computing entity that may implement the end user machine and its related function herein. Any computing entity (system, machine, device, program, process, utility, or the like) may act as the client or the server. There is no limitation on the type of computing entity that may implement the function. The function may be implemented within or in association with other systems, equipment and facilities.

Typically, but without limitation, a client device is a mobile device, such as a smartphone, tablet, or wearable computing device. Such a device comprises a CPU (central processing unit), computer memory, such as RAM, and a drive. The device software includes an operating system (e.g., Google® Android™, or the like), and generic support applications and utilities. The device may also include a graphics processing unit (GPU). The mobile device also includes a touch-sensing device or interface configured to receive input from a user's touch and to send this information to processor. The touch-sensing device typically is a touch screen. The mobile device comprises suitable programming to facilitate gesture-based control, in a manner that is known in the art.

Generalizing, the mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email, WAP, paging, or other known or later-developed wireless data formats. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The underlying network transport may be any communication medium including, without limitation, cellular, wireless, Wi-Fi, small cell (e.g., femto), and combinations thereof.

The hosted application may execute in a cloud environment. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

A cloud computing platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process preferably is implemented in computer software as a set of program instructions executable in one or more processors, as a special-purpose machine.

One or more functions herein described may be carried out as a "service." The service may be carried out as an adjunct or in association with some other services, such as by a CDN, a cloud provider, or some other such service provider.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

What is claimed is:

1. An apparatus, comprising:
a processor;
computer memory storing an operating system (OS) kernel and an associated kernel virtual network device, and computer program instructions configured to forward traffic in association with one or more enterprise applications, the one or more enterprise applications having associated therewith a set of hostnames, the computer program instructions comprising:
program code instantiated as a Domain Name System (DNS) server and configured to remap a hostname of the set from its true IP address to an alternate IP address, the alternate IP address being an address within a defined address range; and
program code comprising a local proxy configured (a) to recognize, via the kernel virtual network device, traffic directed to the alternate IP address and that is destined for the one or more enterprise applications, and (b) to receive and route the traffic over a unique application hostname connection to an external proxy instead of to the one or more enterprise applications;

the local proxy being further configured to multiplex two or more application hostname connections to the external proxy, wherein each application hostname connection is uniquely associated with one of the set of hostnames;

wherein the local proxy also is configured to annotate at least one application hostname connection prior to sending the traffic to the external proxy to enable the two or more application hostname connections to be disambiguated.

2. The apparatus as described in claim 1, wherein the local proxy annotates each application hostname connection prior to sending the traffic to the external proxy.

3. The apparatus as described in claim 1 further including the local proxy tunneling the traffic as annotated from the local proxy to the external proxy.

4. The apparatus as described in claim 3 wherein the external proxy is an edge server in a content delivery network (CDN).

5. The apparatus as described in claim 1 wherein the local proxy is configured to provide an additional service.

6. The apparatus as described in claim 5 wherein the additional service is one of: applying a Quality of Service (QoS), restricting traffic that is determined to exceed a quota, enabling a connection termination, enabling a step-up authentication, and applying a security policy.

7. An access control system, comprising:

a secure computing environment comprising one or more machines that host access to one or more enterprise applications, the one or more enterprise applications having associated therewith a set of hostnames; and an application that executes on a computing device, the computing device having an operating system (OS) kernel and an associated kernel virtual network device, the application comprising:

program code instantiated as a Domain Name System (DNS) server configured to remap a hostname of the set from its true IP address to an alternate IP address, the alternate IP address being an address within a defined address range, and program code comprising a local proxy configured (a) to recognize, via the kernel virtual network device, traffic directed to the alternate IP address and that is destined for the one or more enterprise applications, and (b) to receive and route the traffic over a unique application hostname connection to the secure computing environment instead of the enterprise application;

the local proxy being further configured to multiplex two or more application hostname connections to the secure computing environment, wherein each application hostname connection is uniquely associated with one of the set of hostnames;

wherein the local proxy also is configured to annotate at least one application hostname connection prior to sending the traffic to the external proxy to enable the two or more application hostname connections to be disambiguated.

8. The apparatus as described in claim 1 wherein the OS kernel is Linux and the kernel virtual network device is one of: a TUN interface, and a TAP interface.

9. The apparatus as described in claim 1 wherein the defined address range is user-configured.

10. The apparatus as described in claim 1 wherein the defined address range is auto-discovered.

11. The apparatus as described in claim 1 wherein the defined address range is other than a range being serviced by a Virtual Private Network (VPN).

12. The apparatus as described in claim 1 wherein the computer program instructions are further configured to intercept and process a DNS SRV request while remapping the hostname.

13. The access control system as described in claim 7 wherein the local proxy annotates each application hostname connection prior to sending the traffic to the secure computing environment.

14. The access control system as described in claim 7 wherein the local proxy is further configured to tunnel the traffic as annotated to the secure computing environment.

15. The access control system as described in claim 7 wherein the secure computing environment comprises an edge server in a content delivery network (CDN).

16. The access control system as described in claim 7 wherein the local proxy is further configured to provide an additional service.

17. The access control system as described in claim 16 wherein the additional service is one of: applying a Quality of Service (QoS), restricting traffic that is determined to exceed a quota, enabling a connection termination, enabling a step-up authentication, and applying a security policy.

18. The apparatus as described in claim 1 wherein the local proxy includes an authentication agent that applies an access policy associated with the enterprise application in association with routing the traffic to the external proxy, wherein the access policy is an identity-based access policy defined by an administrator associated with the enterprise application.

19. The access control system as described in claim 7 wherein the local proxy includes an authentication agent that applies an access policy associated with the enterprise application in association with routing the traffic to the external proxy, wherein the access policy is an identity-based access policy defined by an administrator associated with the enterprise application.

* * * * *